(12) United States Patent
Hairer et al.

(10) Patent No.: US 11,602,879 B2
(45) Date of Patent: Mar. 14, 2023

(54) POLYURETHANE-BASED DISPLAY, METHOD FOR PRODUCTION THEREOF, AND USE OF THE POLYURETHANE-BASED DISPLAY AND VEHICLE WITH A POLYURETHANE-BASED DISPLAY

(71) Applicant: Bayerische Motoren Werke Aktiengesellschaft, Munich (DE)

(72) Inventors: Gabriel Hairer, Munich (DE); Michael Strolz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 103 days.

(21) Appl. No.: 16/582,839

(22) Filed: Sep. 25, 2019

(65) Prior Publication Data

US 2020/0016807 A1 Jan. 16, 2020

Related U.S. Application Data

(63) Continuation of application No. PCT/EP2018/056523, filed on Mar. 15, 2018.

(30) Foreign Application Priority Data

Mar. 28, 2017 (DE) ...................... 10 2017 205 202.3

(51) Int. Cl.
*B29C 45/16* (2006.01)
*B60K 35/00* (2006.01)
(Continued)

(52) U.S. Cl.
CPC ...... *B29C 45/1671* (2013.01); *B29C 45/1657* (2013.01); *B60K 35/00* (2013.01);
(Continued)

(58) Field of Classification Search
CPC ............ B29C 45/1671; B29C 45/1657; B29C 2045/1668; B29C 2045/1673;
(Continued)

(56) References Cited

U.S. PATENT DOCUMENTS

| 4,131,667 A | * | 12/1978 | Lovell | .................... C08K 3/013 |
| | | | | 264/225 |
| 4,795,667 A | * | 1/1989 | Armstrong | .............. B29C 70/74 |
| | | | | 264/254 |

(Continued)

FOREIGN PATENT DOCUMENTS

| CN | 202169980 U | 3/2012 |
| CN | 104143602 A | 11/2014 |

(Continued)

OTHER PUBLICATIONS

[NPL-1] Blanco Jr., Frank; Maybaum, Laura; "Ink Selection for Screen Printing on Metal". Nazdar (Feb. 2006), <https://www.nazdar.com/Portals/0/NewsItems/Articles/screen_print_for_metal.pdf>. (Year: 2006).*

(Continued)

*Primary Examiner* — David Sample
*Assistant Examiner* — Donald M Flores, Jr.
(74) *Attorney, Agent, or Firm* — Crowell & Moring LLP

(57) ABSTRACT

A polyurethane-based display, in particular for a vehicle, includes a decorative element with at least one cutout. At least one printed sheet is disposed in the at least one cutout such that the printed part of the printed sheet is visible. The printed sheet is coated with a first polyurethane layer.

15 Claims, 2 Drawing Sheets

(51) Int. Cl.
*B29K 75/00* (2006.01)
*B29L 31/30* (2006.01)

(52) U.S. Cl.
CPC ............. *B29C 2045/1668* (2013.01); *B29C 2045/1673* (2013.01); *B29C 2793/009* (2013.01); *B29K 2075/00* (2013.01); *B29L 2031/3005* (2013.01); *B60K 2370/152* (2019.05); *Y10T 428/24479* (2015.01)

(58) Field of Classification Search
CPC .............. B29C 2793/009; B60K 35/00; B60K 2370/152; B60K 2370/1537; Y10T 428/24479; B29K 2075/00; B29L 2031/3005; B29L 2031/3475
See application file for complete search history.

(56) References Cited

U.S. PATENT DOCUMENTS

| | | | | |
|---|---|---|---|---|
| 6,129,400 | A * | 10/2000 | Jakubiec | B60R 7/04 220/521 |
| 2007/0194487 | A1* | 8/2007 | Neitzke | B32B 15/08 264/494 |
| 2015/0017404 | A1* | 1/2015 | Gayer | B44C 3/04 428/207 |
| 2016/0089850 | A1* | 3/2016 | Hamada | B44C 3/08 156/268 |
| 2016/0280128 | A1* | 9/2016 | Cannon | B60Q 3/14 |
| 2017/0139506 | A1* | 5/2017 | Rodriguez | G06F 3/0443 |
| 2017/0165884 | A1* | 6/2017 | Benyahia | B32B 27/302 |

FOREIGN PATENT DOCUMENTS

| | | | |
|---|---|---|---|
| CN | 104969284 A | 10/2015 | |
| CN | 105980127 A | 9/2016 | |
| CN | 106457634 A | 2/2017 | |
| DE | 100 58 090 C1 | 10/2002 | |
| DE | 102 39 579 A1 | 1/2004 | |
| DE | 10256413 A1 * | 6/2004 | ......... B29C 47/0023 |
| DE | 10 2009 032 815 A1 | 1/2011 | |
| DE | 10 2013 214 544 A1 | 1/2015 | |
| DE | 10 2013 114 276 A1 | 6/2015 | |
| DE | 10 2015 104 299 A1 | 9/2016 | |
| EP | 2 496 485 B1 | 9/2012 | |
| EP | 2 684 744 A1 | 1/2014 | |
| EP | 2 765 570 A1 | 8/2014 | |
| EP | 3 072 743 A2 | 9/2016 | |
| JP | 63-312817 A | 12/1988 | |
| WO | WO 2007/116942 A1 | 10/2007 | |

OTHER PUBLICATIONS

[NPL-2] Budde et al. (DE 10256413 A1), Jun. 2004 (EPO—machine translation to English). (Year: 2004).*
Chinese Office Action issued in Chinese application No. 201880007412.4 dated Dec. 14, 2020, with English translation (Twenty Three (23) pages).
PCT/EP2018/056523, International Search Report dated Apr. 25, 2018 (Two (2) pages).
German Search Report issued in German counterpart application No. 10 2017 205 202.3 dated Feb. 7, 2018, with Statement of Relevancy (Seven (7) pages).

* cited by examiner

POLYURETHANE-BASED DISPLAY, METHOD FOR PRODUCTION THEREOF, AND USE OF THE POLYURETHANE-BASED DISPLAY AND VEHICLE WITH A POLYURETHANE-BASED DISPLAY

CROSS REFERENCE TO RELATED APPLICATIONS

This application is a continuation of PCT International Application No. PCT/EP2018/056523, filed Mar. 15, 2018, which claims priority under 35 U.S.C. § 119 from German Patent Application No. 10 2017 205 202.3, filed Mar. 28, 2017, the entire disclosures of which are herein expressly incorporated by reference.

BACKGROUND AND SUMMARY OF THE INVENTION

The present invention relates to a polyurethane-based display, in particular for vehicles, and to a method for producing such a display and also to the use of such a display and to a vehicle with a polyurethane-based display.

Ceramic-based materials are commonly used as displays of actuating devices in vehicles. Such ceramic materials give the actuating devices, for example gear-selector switches, a pleasant feel and, in addition, a high-quality appearance. However, ceramic components are expensive, for which reason additional plastic components are often used for representing the display symbols. It is known to have, for example, display elements of actuating devices in vehicles in which plastic symbols are introduced by means of injection molding into ceramic-surface cutouts which form the appropriate symbol shape. However, this involves a number of disadvantages. On the one hand, high development-related outlay is necessary and the appearance of these symbols, in addition, is not of high quality since the ceramic crosspieces are visible. Furthermore, producing the symbol-shaped cutouts in the ceramic surfaces causes a large amount of ceramic-material waste. Moreover, these display elements have a low level of stability since the ceramic crosspieces, for example the triangle in the letter "A", break easily. The sharp edges which appear on the ceramic surface when the symbol-shaped cutouts are produced also mean that an additional grinding step is necessary. This also leads to higher tool costs. DE 102013214544 A1 describes a ceramic molding for display purposes, in which use is made of a cutout in the form of a symbol and of a plate-form inlay. In this case, the disadvantages of the ceramic crosspieces are eliminated in that an inlay in the form of a plate, for example the triangle in the letter "A", is back-molded with the plastic for the symbol-shaped cutout. However, such inlays are very costly and time-consuming to produce. It is also the case that the long-term adhesion of these plate-like inlays under frequent mechanical loading and also the scratch resistance of the molding are not satisfactory. In addition, it is not possible for the resulting symbols to have a pleasing appearance and pleasant feel if the plates are applied to the plastic. Moreover, this method quickly comes up against limits of procedural economy in the task of representing different colors, patterns and designs. It is also the case that sheets which are printed with symbols and have a level of scratch protection are adhesively bonded to ceramic surfaces. However, high-cost special adhesives have to be used here to provide permanent mechanical stability, and the development and production costs for such display elements are high. In addition, such sheets have design limitations, since the scratch-resistant coating cannot be adapted satisfactorily to designs.

Proceeding from this prior art, it is an object of the present invention to specify a display, in particular for vehicles, which is robust and/or mechanically stable and scratch-resistant, which can be produced advantageously and at relatively low development and production costs and which has more degrees of freedom in design terms. It is also an object of the present invention to specify a method for producing a display which provides a robust and/or mechanically stable and scratch-resistant display in a small number of steps, with development and production costs being reduced. It is a further object of the present invention to specify a vehicle with the polyurethane-based display and the use for such a display.

The object is achieved by the polyurethane-based vehicle display according to the invention. The polyurethane-based display comprises a decorative element having at least one cutout, wherein at least one printed sheet is arranged in the cutout such that the printed part is visible, and wherein the sheet is coated with a first polyurethane layer.

The decorative element is a base material or support component for the display and helps to give the display a high-quality appearance and a feel which is pleasant to the user's touch, and it is therefore well-suited for display elements, for example in vehicles. The decorative element is not limited either in terms of material or in respect of shaping and can comprise materials which have a pleasing appearance and a pleasant feel. In order to meet particularly stringent requirements relating to feel, the decorative element can consist, in particular, of ceramic material.

In order to provide a mechanically stable display, the printed sheet is arranged in a visible state in at least one cutout of the decorative element. The cutout here is a depression in the surface of the decorative element, which can be of any desired shape and is designed to accommodate the printed sheet.

The printed sheet does not have specific limitations. The printing contained thereon serves, in particular, to inform a user and comprises symbols which are suitable for this purpose.

The first polyurethane layer is applied to the printed sheet. That part of the printed sheet which is coated with the first polyurethane layer is thereby rendered selectively scratch-resistant, as a result of which the amount of material used can be reduced, when there is no need for example for the entire printed sheet to meet the requirement of high-level scratch resistance on account of mechanical loading. The essential factor here is that the printed part of the sheet is coated with the first polyurethane layer in order thus to ensure a permanent display function. Coating a printed sheet with a first polyurethane layer provides for higher degrees of design freedom, since the printed sheet need not be designed specifically in respect of a high level of stability since the latter, and in addition a high level of scratch resistance, can be achieved on a permanent basis by the first polyurethane layer.

The structure and configuration of the elements of the polyurethane-based display according to the invention mean that the latter is robust and/or mechanically stable and scratch-resistant and, in addition, can be produced at low development and production costs. Furthermore, the display can be designed with any desired configuration, and it therefore has a high degree of freedom in design terms.

According to an advantageous development, the printed sheet is fully coated with the first polyurethane layer. The scratch resistance of the display can be significantly increased as a result. In addition, the full coating helps to increase the mechanical stability, since the first polyurethane layer establishes a comprehensive, in particular form-fitting, connection with the decorative element.

A further advantageous development is characterized in that the decorative element comprises ceramic material, wood, wood veneer, glass, stone or a combination thereof. This allows the present invention to provide a display in a multiplicity of different basic design variants which are suitable as decorative elements in particular in vehicles and ensure a pleasant feel and high-quality appearance.

The printed sheet can be printed with any kind of pattern, wherein the printing of these patterns is independent of the rest of the polyurethane-based display. In addition, the printed sheet can be introduced straightforwardly into any kind of cutout. This contributes to increased degrees of design freedom and reduces the development costs. The printed sheet can be produced, for example, from plastic or other known and advantageous sheet materials.

In order to create the highest possible variability in design for the display according to the invention, the printed sheet advantageously comprises letters, images, numbers or a combination thereof. Designs and patterns of any kind are therefore possible. International letters, e.g., Asian letters, in particular Chinese letters, Japanese letters, Indian letters or Arabic letters, are also possible, which helps the polyurethane-based display according to the invention to gain acceptance worldwide. Furthermore, the images can be colored or black and white.

A further advantageous development of the invention is characterized in that a second polyurethane layer is arranged between the printed sheet and the first polyurethane layer and/or between the printed sheet and the decorative element. As a result of the second polyurethane layer between the sheet and the decorative element, the sheet is clamped in between the two polyurethane layers, which results in better fixing of the printed sheet and therefore in improved mechanical stability. As a result of a second polyurethane layer between the printed sheet and the first polyurethane layer, additional fixing of the printed sheet is achieved. The provision of a second polyurethane layer can also improve the feel of the display according to the invention.

In order to render the production process of the polyurethane-based display according to the invention more cost-effective and environmentally friendly, a connection between the printed sheet and the decorative element and/or a connection between the first polyurethane layer and the printed sheet and/or a connection between the second polyurethane layer and the decorative element and/or a connection between the second polyurethane layer and the printed sheet are/is free of adhesive. This does away with in particular an adhesive-bonding step in the production process. It is thus also possible to improve long-term stability of the polyurethane-based display, since adhesives usually tend to become brittle.

The decorative element further advantageously comprises holes and/or spikes by means of which the first and/or the second polyurethane layer are/is additionally fixed. The first and/or second polyurethane layer are/is mechanically stabilized as a result.

A further advantageous further development of the present invention is distinguished by holes and/or spikes by means of which the printed sheet is fixed and thus mechanically stabilized.

The above-described holes and spikes can connect the first polyurethane layer, the second polyurethane layer or the printed sheet in a form-fitting manner to the element containing the spikes and/or holes. Furthermore, it is possible in particular also for the sheet to be fixed by a form-fitting connection which the first polyurethane layer establishes with the walls of the cutout, with the holes, spikes or a combination thereof.

In order to maximize the visibility of the printed sheet, the first and/or the second polyurethane layer are/is advantageously transparent.

The invention also describes a method for producing a polyurethane-based display as disclosed above. The method comprises, in a first step, the preparation of the decorative element with a cutout. Suitable processes for this purpose are all known material-machining processes such as sawing, grinding, milling, turning or 3D printing or combinations thereof. The cutout can be formed in the shape of a partial ellipsoid, of a hemisphere or in other geometrical shapes. Separating the machining of the decorative element from the machining of the rest of the display components can reduce the complexity of the method, which has a positive effect on the development and production costs.

In a second step, the printed sheet is introduced into the cutout of the decorative element. The printed sheet here can be introduced irrespective of the shape of the cutout, which contributes to increased degrees of design freedom. This advantage is achieved in addition in that the sheet can be printed as desired. The printed sheet can advantageously be fastened on the cutout via spikes or holes. The sheet can have corresponding means, for example protrusions, for form-fitting connection to holes provided. As a result, the printed sheet can be fixed in a mechanically stable manner and is thus no longer able to slip.

In a third step, a first polyurethane layer is applied to the printed sheet. This can take place, for example, via injection molding and has two functions: on the one hand, the first polyurethane layer provides a scratch-resistant surface for regions of the printed sheet which are subjected to stressing, which results in the sheet being protected against wear. This can be done, in particular, for those regions of the printed sheet which are subjected to a high level of mechanical stressing. On the other hand, the printed sheet can be fixed in a form-fitting manner by the first polyurethane layer when the latter establishes for example a form-fitting connection with the walls of the cutout of the decorative element or with spikes and holes of the decorative element or with a combination thereof.

According to an advantageous further development of the method according to the invention, the first polyurethane layer is applied such that it fully covers the sheet, as a result of which an increased level of scratch protection and therefore an increased level of robustness are achieved and as a result of which it is possible to establish even stronger form-fitting connections of the first polyurethane layer with the walls, spikes or holes of the decorative element or combinations thereof.

A further advantageous development is characterized in that the operation of applying the first polyurethane layer to the printed sheet is followed by a fourth step for grinding and/or polishing the surface which is formed from the decorative element and from the first polyurethane layer in the cutout of the decorative element. This makes it possible to give the polyurethane-based display a rounded appearance, and a pleasant feel can be achieved in addition.

A further advantageous development of the invention is distinguished in that the first polyurethane layer is applied in the third step by means of injection molding. Since polyurethane can be processed straightforwardly in this way, this results in a reduction in the production costs along with precise application of the first polyurethane layer.

A second polyurethane layer is further advantageously introduced into the cutout of the decorative element, by injection molding, before or after the second step of introducing the printed sheet. This serves to provide additional stabilization for the display and, in addition, improves the feel of the same. It is also possible for the sheet to be clamped in, for example, between the first and second polyurethane layers during manufacturing, as a result of which additional mechanical fixing takes place. It is therefore advantageous in particular for the printed sheet to be fully back-molded with the second polyurethane layer.

It is also advantageous for the method to be free from the use of adhesive, as a result of which it is possible to reduce development and production costs and as a result of which a positive contribution is made to render the process environmentally friendly.

It is also advantageous for the decorative element to be fired in the first step, in order for the decorative element to be given a particular level of stability, which can be the case for example for ceramic green bodies.

The invention also specifies a polyurethane-based display as disclosed above being used in an instrument panel for vehicles or in a gear-selector switch, or in a door-trim panel, for vehicles.

This use according to the invention can provide for instrument panels, gear-selector switches or door-trim panels for vehicles with a high level of robustness, a pleasing appearance and a pleasant feel, along with low production and development costs and with a wide variety of degrees of design freedom.

The invention also describes a vehicle which comprises the polyurethane-based display disclosed above. The latter is distinguished by good scratch resistance and high degrees of design freedom.

The advantages, advantageous effects and developments described for the polyurethane-based display according to the invention also apply to the method according to the invention for producing a polyurethane-based display, to the vehicle according to the invention and to the use according to the invention of a polyurethane-based display.

Further details, features and advantages of the invention can be gathered from the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

The present invention will be explained in detail with reference to three exemplary embodiments. The figures illustrate all the essential features of the invention. For the sake of clarity, all the rest of the features have been left out.

Figure 1:
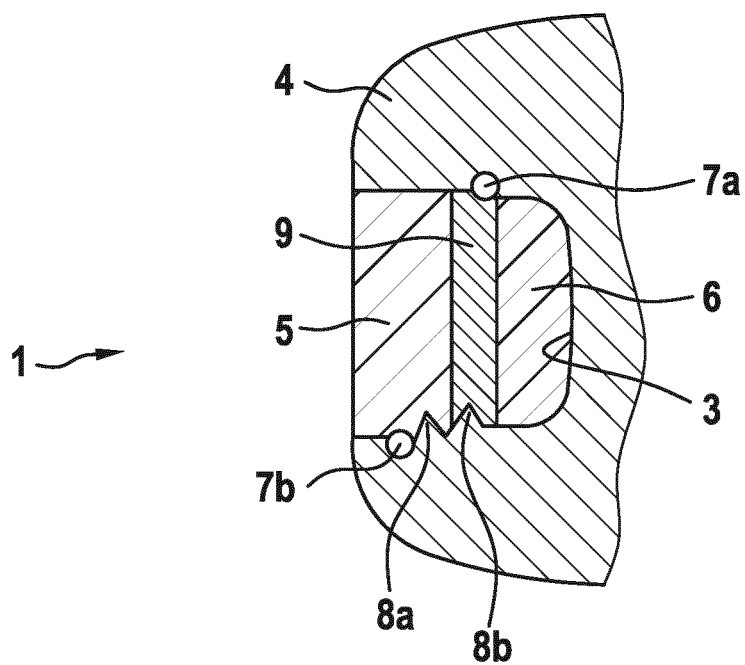
FIG. 1 shows a sectional view of a polyurethane-based display according to one embodiment of the invention.

FIG. 1 shows a sectional view of a detail of a polyurethane-based display 1 according to one embodiment of the invention. The polyurethane-based display 1 can be designed for arrangement in a vehicle, for example for an actuating device in an instrument panel. The display 1 comprises a decorative element 4, which has at least one cutout 3, in which a printed sheet 9 is arranged such that the printed part is visible, wherein the printed sheet 9 is fully coated with a first polyurethane layer 5. This renders the polyurethane-based display 1 particularly resistant to scratching. The first polyurethane layer 5 can be applied by known methods, for example by injection molding, since polyurethane can be processed particularly straightforwardly in this way.

The printed sheet 9 comprises images, numbers, letters or a combination thereof, and this makes it possible to have designs of any kind at low production and development costs. The printed sheet 9 can be produced straightforwardly using all known sheet-printing techniques. Furthermore, the flexibility of the printed sheet means that the latter can be introduced into any kind of cutout 3, as a result of which the degrees of design freedom are increased. The printed sheet can comprise, for example, plastic or other known and advantageous sheet materials.

The decorative element 4 comprises ceramic material, wood, wood veneer, glass, stone or a combination thereof, in particular ceramic material, and can be made into any desired shape by known material-machining methods, e.g., grinding, drilling, turning, sawing or milling, as a result of which the display has a high-quality feel and appearance.

The cutout 3 is present in the decorative element 4 in the form of a cavity and serves to connect the decorative element 4 to the printed sheet 9 and the first polyurethane layer 5. It is possible for the cutout 3 to be, for example, hemispherical, to be a blind bore, to be partially ellipsoidal or to be in other geometrical shapes and to be produced using conventional techniques such as drilling or grinding or milling. Furthermore, the cutout 3 has holes 7a, 7b and spikes 8a, 8b, as a result of which the mechanical stability of the polyurethane-based display, as will be explained hereinbelow, is increased.

In FIG. 1, a second polyurethane layer 6 is arranged between the printed sheet 9 and the decorative element 4. The printed sheet 9 here is clamped in a sandwich-like manner between the first polyurethane layer 5 and the second polyurethane layer 6, which results in the printed sheet 9 being additionally stabilized and secures the sheet against slipping. It is likewise possible for an additional, second polyurethane layer (for the sake of clarity, not shown here) to be arranged between the printed sheet 9 and the first polyurethane layer 5. The second polyurethane layer can ensure further stabilization of the printed sheet 9, as a result of a form-fitting connection between the layer and the cutout 3.

The connection between the printed sheet 9 and the decorative element 4 and the connection between the first polyurethane layer 5 and the decorative element 4 and between the second polyurethane layer 6 and the decorative element 4 are each free of adhesive, as a result of which there is both a reduction in costs for expensive adhesives and the additional adhesive-bonding step is done away with. Therefore, the polyurethane-based display 1 can be produced in an environmentally friendly manner.

The decorative element 4 comprises holes 7b and spikes 8a in order to fix the first polyurethane layer 5 to better effect. This results in form-fitting, and possibly also force-fitting, connections as the first polyurethane layer 5 is injected, for example, into the holes 7b or is arranged around the spikes 8a. Such holes and spikes can be produced with the aid of techniques disclosed above. Therefore, the first polyurethane layer is mechanically stabilized and secured against falling out. This is advantageous in particular when the first polyurethane layer 5 warps under thermal stress caused, for example, by the ambient temperature.

For the same reason, the decorative element 4 comprises holes 7a and spikes 8b in order to fix the printed sheet 9 in a form-fitting manner, and possibly also in a force-fitting manner. It is possible here for additional known means, for example pins or protrusions (for the sake of clarity, not shown), to be fitted on the sheet in order for the latter to be connected by way of the holes 7a. The spikes 8b can either clamp the sheet or pierce it for fixing purposes.

The first polyurethane layer 5 and the second polyurethane layer 6 are transparent, in order to maximize the visibility of the printed sheet.

The polyurethane-based display 1 is distinguished in that it can be produced cost-effectively, i.e., without high production and development costs, it is scratch-resistant and mechanically stable and has high degrees of design freedom.

Figure 2:
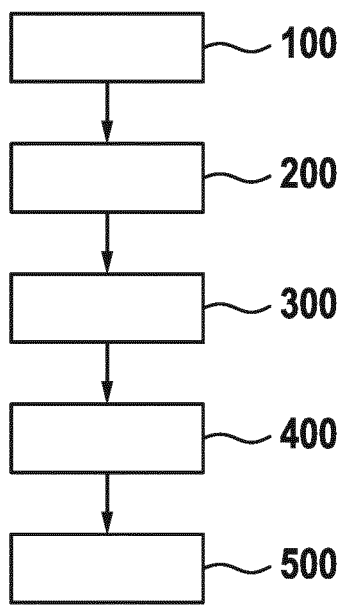
FIG. 2 shows a schematic flow diagram for demonstrating a method for producing a polyurethane-based display according to one embodiment of the invention.

FIG. 2 gives a detailed overview of steps of a method for producing a polyurethane-based display 1 according to one embodiment of the invention. In a first step 100, the decorative element 4 is prepared. Suitable processes for this purpose are all known material-machining processes such as sawing, grinding, milling, turning or 3D printing or combinations thereof. It is also possible for the decorative element 4 to be fired, which is advantageous, particularly for the stability of the decorative element 4, when the latter consists of ceramic material. A cutout 3 for the decorative element 4 is also produced here.

In a second step 200, a second polyurethane layer 6 is introduced into the cutout 3 of the decorative element by injection molding, this creating the base for the above-described sandwich-like and very stable fixing of the sheet. This step can be carried out quickly and cost-effectively.

In a third step 300, the printed sheet is applied to the back-molded, second polyurethane layer 6. It is also possible for the injection molding of the second polyurethane layer 6 to be carried out, preferably in the second step 300, such that the entire printed sheet 9 is provided with back-molding. Since the sheet can be produced in an advantageous manner, in addition to the development costs being lower, it is also the case that a high degree of design freedom is ensured as a result of the flexibility of the printed sheet 9, since the latter can be adapted to any shapes of cutout.

In a fourth step 400, the first polyurethane layer 5 is applied to the printed sheet 9 by means of injection molding such that it fully covers the sheet. This advantageously results in the printed sheet 9 having a scratch-resistant coating, which gives it a high level of robustness. Furthermore, the printed sheet 9 is now fixed in a sandwich-like manner between the first polyurethane layer 5 and the second polyurethane layer 6, which additionally provides it with a high level of mechanical stability.

In a fifth step 500, the surface produced by the decorative element 4 and by the first polyurethane layer 5 in the cutout 3 of the decorative element 4 is ground or polished, which can be achieved by conventional grinding or polishing methods, as a result of which the polyurethane-based display 1 has a pleasant feel and a pleasing appearance.

The method illustrated here is distinguished by being straightforward to implement and by low production and development costs. The method according to the invention can produce a robust polyurethane-based display, and this method provides for high degrees of design freedom.

Figure 3:
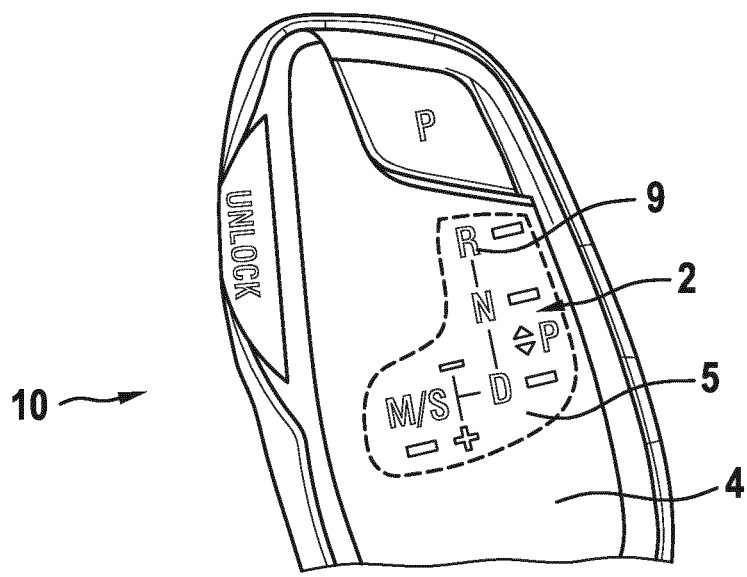
FIG. 3 shows a schematic illustration of a gear-selector switch having a polyurethane-based display according to one embodiment of the invention.

FIG. 3 shows a gear-selector switch 10 for vehicles which comprises a decorative element 4, for example made of ceramic material. The first polyurethane layer 5 is transparent and thus renders visible the symbols 2 of the printed sheet 9 in the cutout 3 (not shown). These elements together form the polyurethane-based display 1 according to the invention. The polyurethane-based display 1 according to the invention provides a high variability in terms of the design of a gear-selector switch 10 for vehicles and also a shape with a pleasing appearance and a pleasant feel.

LIST OF REFERENCE CHARACTERS

1 Polyurethane-based display
2 Symbols
3 Cutout
4 Decorative element
5 First polyurethane layer
6 Second polyurethane layer
7a Hole
7b Hole
8a Spike
8b Spike
9 Printed sheet
10 Gear-selector switch
100 Method step
200 Method step
300 Method step
400 Method step
500 Method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A polyurethane-based display, comprising:
   a decorative element having a cutout in a form of a blind bore with walls, wherein the decorative element comprises wood, wood veneer, ceramic material, stone or a combination thereof;
   a printed sheet, wherein the printed sheet is disposed in the cutout such that a printed part of the printed sheet is visible and such that the walls of the cutout extend beyond the printed sheet toward a surface of the decorative element; and
   a first polyurethane layer, wherein a visible side of the printed sheet is coated with the first polyurethane layer, wherein the first polyurethane layer fills a volume of the cutout defined by the printed sheet and the walls of the cutout, wherein the first polyurethane layer forms a form-fitting connection with the walls of the cutout, and wherein a surface of the first polyurethane layer opposite the printed sheet is aligned with the surface of the decorative element.

2. The polyurethane-based display according to claim 1, wherein the printed sheet includes images, numbers, letters or a combination thereof.

3. The polyurethane-based display according to claim 1, further comprising a second polyurethane layer, wherein the second polyurethane layer is disposed between the decorative element and the printed sheet such that the printed sheet is clamped in a sandwich-like manner between the first polyurethane layer and the second polyurethane layer.

4. The polyurethane-based display according to claim 3, wherein a connection between the second polyurethane layer and the decorative element is free of adhesive.

5. The polyurethane-based display according to claim 3, wherein a connection between the second polyurethane layer and the printed sheet is free of adhesive.

6. The polyurethane-based display according to claim 3, wherein the first polyurethane layer is transparent and/or the second polyurethane layer is transparent.

7. The polyurethane-based display according to claim 1, wherein a connection between the printed sheet and the decorative element is free of adhesive.

8. The polyurethane-based display according to claim 1, wherein a connection between the first polyurethane layer and the printed sheet is free of adhesive.

9. The polyurethane-based display according to claim 1, wherein the decorative element includes a hole and/or a spike via which the first polyurethane layer is fixed.

10. The polyurethane-based display according to claim 1, wherein the decorative element includes a hole and/or a spike via which the printed sheet is fixed.

11. The polyurethane-based display according to claim 1, wherein the polyurethane-based display is a gear-selector switch for a vehicle.

12. A method for producing the polyurethane-based display according to claim 1, comprising the steps of:
   a) preparing the decorative element with the cutout;
   b) introducing the printed sheet into the cutout of the decorative element; and
   c) applying the first polyurethane layer to the printed sheet.

13. The method according to claim 12, further comprising the step of:
   d) grinding and/or polishing a surface which is produced by the decorative element and by the first polyurethane layer in the cutout of the decorative element;
   wherein step d) occurs after step c).

14. The method according to claim 12, wherein the first polyurethane layer is applied in step c) by injection molding.

15. The method according to claim 12, further comprising the step of:
   e) introducing a second polyurethane layer into the cutout by injection molding;
   wherein step e) occurs before or after step b).

\* \* \* \* \*